United States Patent
Ogawa

(10) Patent No.: US 11,785,693 B2
(45) Date of Patent: Oct. 10, 2023

(54) LIGHT SOURCE UNIT, PROJECTOR, AND LIGHT SOURCE CONTROL METHOD

(71) Applicant: CASIO COMPUTER CO., LTD., Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 287 days.

(21) Appl. No.: 17/190,580

(22) Filed: Mar. 3, 2021

(65) Prior Publication Data
US 2021/0282247 A1    Sep. 9, 2021

(30) Foreign Application Priority Data

Mar. 3, 2020    (JP) ................................ 2020-035782

(51) Int. Cl.
| | |
|---|---|
| G03B 21/20 | (2006.01) |
| H05B 47/155 | (2020.01) |
| H05B 47/16 | (2020.01) |
| G02B 26/00 | (2006.01) |

(52) U.S. Cl.
CPC ......... *H05B 47/155* (2020.01); *G02B 26/008* (2013.01); *G03B 21/204* (2013.01); *H05B 47/16* (2020.01)

(58) Field of Classification Search
CPC .... H04B 47/155; H04B 47/16; G02B 26/008; G03B 21/204
USPC .......................................................... 353/85
See application file for complete search history.

(56) References Cited

U.S. PATENT DOCUMENTS 8,272,745 B2 * 9/2012 Shibasaki .............. G03B 21/28
348/743

FOREIGN PATENT DOCUMENTS

| CN | 102645822 A | * | 8/2012 | ............. G03B 21/00 |
|---|---|---|---|---|
| CN | 102645822 A | | 8/2012 | |
| JP | 2017058569 A | | 3/2017 | |
| JP | 2018-156874 A | | 10/2018 | |

OTHER PUBLICATIONS

Translation of CN-102645822-A (Year: 2023).*
CNIPA; Application No. 202110231269.0; Office Action dated Mar. 15, 2022.

* cited by examiner

*Primary Examiner* — Jerry L Brooks
(74) *Attorney, Agent, or Firm* — Fitch, Even, Tabin & Flannery LLP

(57) ABSTRACT

A light source unit includes a first light source for first light, a second light source for second light differing from the first light, a display device for performing a gradation control on the first light and the second light which are emitted in a time dividing fashion in corresponding gradation control periods to thereby form image light, and a processor configured to control a first dimming mode for adjusting a quantity of light of the first light source in the gradation control periods of the first light and the second light and a second dimming mode for adjusting the quantity of light of the first light source by performing a turn-off control in at least a partial period of the gradation control period of the first light and adjusting the quantity of light of the first light source in the gradation control period of the second light.

15 Claims, 7 Drawing Sheets

FIG.6

| POWER CONSUMPTION % | | RED LIGHT 90a | GREEN LIGHT 90b | BLUE LIGHT 90c |
|---|---|---|---|---|
| | | RED RED 121 | BLUE LD 71 | |
| 100 | Duty | 178° | 127° | 55° |
| | INPUT CURRENT | 9.20A | 4.00A | 4.00A |
| 50 | Duty | 178° | 127° | 55° |
| | INPUT CURRENT | 4.60A | 2.00A | 2.00A |
| 12.5 | Duty | 55° | 55° | 55° |
| | INPUT CURRENT | 3.72A | 1.15A | 0.50A |
| 6.25 | Duty | 55° | 55° | 55° |
| | INPUT CURRENT | 1.86A | 0.58A | 0.50A |

Ta — Tb — Tc 91, 92, 93, 94

LIGHT SOURCE UNIT, PROJECTOR, AND LIGHT SOURCE CONTROL METHOD

CROSS-REFERENCE TO RELATED APPLICATION

This patent application is based upon and claims the benefit of priority under 35 USC 119 from Japanese Patent Application No. 2020-035782 filed on Mar. 3, 2020, the entire disclosure of which, including the specification, claims, drawings and abstract, is incorporated herein by reference in its entirety.

BACKGROUND OF THE INVENTION

Field of the Invention

The present invention relates to a light source unit, a projector, and a light source control method.

Description of the Related Art

There have conventionally been proposed projectors for projecting an image formed by use of a micromirror display device called a digital micromirror device (DMD) or a liquid crystal panel onto a screen. For example, Japanese Patent Laid-Open No. 2018-156874 (JP-A-2018-156874) discloses a projector including an excitation light shining device including a semiconductor light emitting element for emitting light having a wavelength in the blue wavelength range or simply light in the blue wavelength range, a luminescent wheel configured to receive light in the blue wavelength range as excitation light to emit light having a wavelength in the green wavelength range or simply light in the green wavelength range, and a red light source device for emitting light having a wavelength in the red wavelength range or simply light in the red wavelength range, wherein lights in the blue, green and red wavelength ranges are shined onto DMD, which is a display device, in a time-sharing fashion to form an image.

SUMMARY OF THE INVENTION

The present invention has been made in view of the situations described above, and an object thereof is to provide a light source unit, a projector including the light source unit, and a light source control method.

According to one aspect of the present invention, there is provided alight source unit including a first light source for emitting light in a first wavelength range, a second light source for emitting light in a second wavelength range which differs in wavelength range from the first wavelength range, a display device configured to perform a gradation control on the light in the first wavelength range and the light in the second wavelength range which are emitted in a time dividing fashion in corresponding gradation control periods to thereby form image light, and a processor configured to control a first dimming mode for adjusting a quantity of the first light source in the gradation control periods during which the light in the first wavelength range and the light in the second wavelength range are emitted, respectively, and a second dimming mode for adjusting the quantity of light of the first light source by performing a turn-off control in which at least one of turning on and turning off the first light source is controlled in at least a partial period of the gradation control period during which the light in the first wavelength range is emitted and adjusting the quantity of light of the first light source in the gradation control period during which the light in the second wavelength range is emitted.

BRIEF DESCRIPTION OF THE DRAWINGS

FIG. 6 is a chart showing set values for the light source unit according to the embodiment.

DETAILED DESCRIPTION OF THE PREFERRED EMBODIMENT

Figure 1:
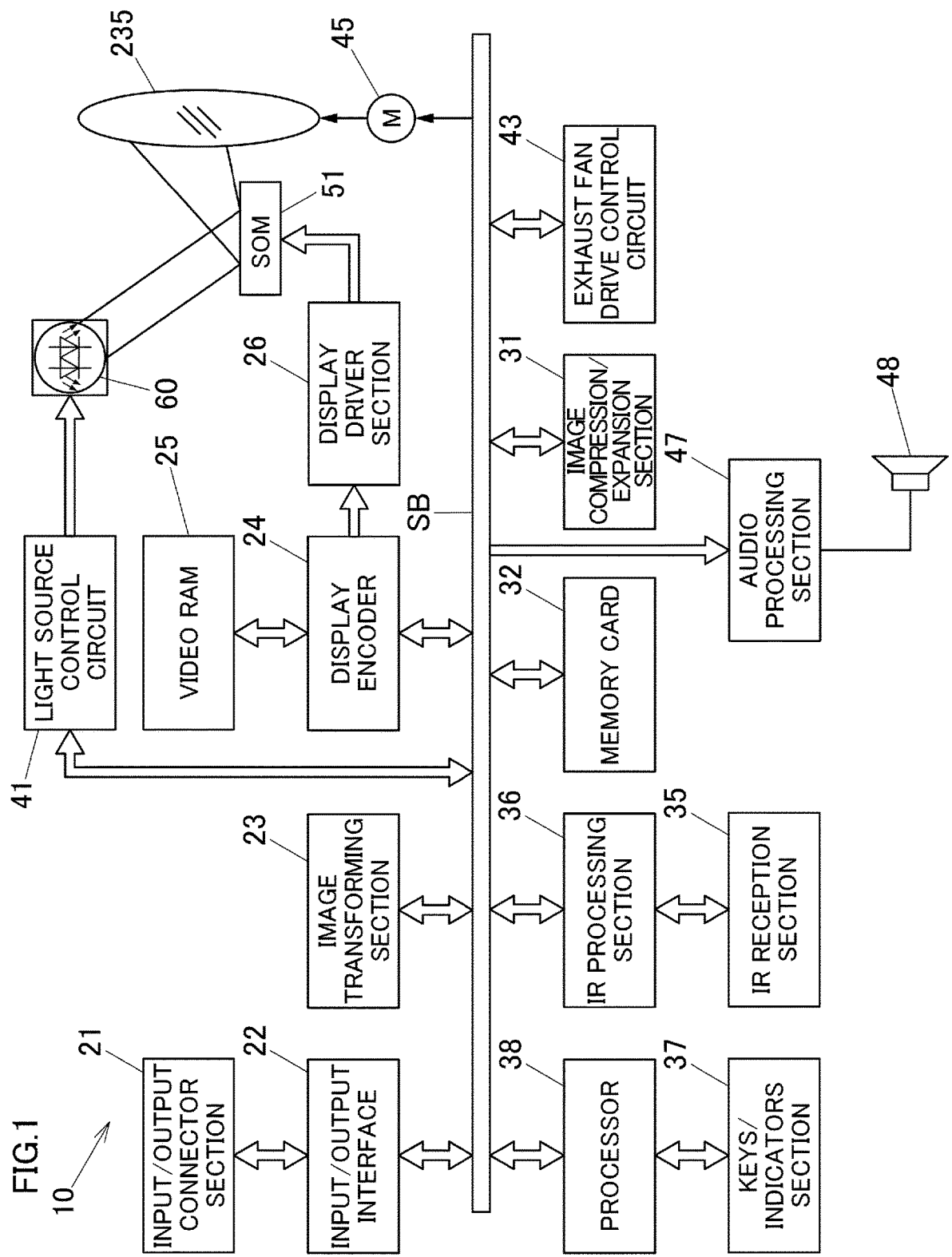
FIG. 1 is a block diagram showing functional circuitries of a projector according to an embodiment of the present invention.

Hereinafter, an embodiment of the present invention will be described. FIG. 1 is a block diagram showing functional circuitries of a projector 10. A projector control unit is configured of CPU including an image transforming section 23 and a processor 38, a front-end unit including an input/output interface 22, and a formatter unit including a display encoder 24 and a display drive section 26. Image signals of various standards which are input from an input/output connector section 21 are sent to the image transforming section 23 via the input/output interface 22 and a system bus SB, and the image signals so sent are transformed so as to be unified into an image signal of a predetermined format which is suitable for display in the image transforming section 23. Thereafter, the unified image signal is output to the display encoder 24.

The display encoder 24 deploys the image signal input thereinto on a video RAM 25 for storage therein and generates a video signal from the contents of the video RAM 25 stored therein, outputting the video signal so generated to the display drive section 26.

The display drive section 26 drives a display device 51, which is a spatial optical modulator (SOM), at an appropriate frame rate in response to the image signal output from the display encoder 24. Then, in the projector 10, a pencil of light emitted from a light source unit 60 is shined onto the display device 51 via a light guiding optical system, whereby an optical image is formed by reflected light reflected by the display device 51, and the image so formed is then projected onto a projection target body such as a screen, not shown, via a projection optical system 220 (refer to FIG. 2) for display on the screen. A movable lens group 235 of the projection optical system 220 can be driven by a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman effect and the like, and the compressed data is sequentially written on a memory card 32, which is a detachable recording medium. Further, with the projector 10 set in a reproducing mode, the image compression/expansion section 31 reads out the image data recorded in the memory card 32 and expands the individual image data that makes up a series of dynamic images frame by frame, outputting the image data to the display encoder 24 byway of the image transforming section 23. As a result, the image compression/expansion section 31 can output dynamic images or the like based on the image data stored in the memory card 32.

The processor 38 governs the control of operations of individual circuitries inside the projector 10 and is configured of CPU, ROM that stores fixedly operation programs such as various settings or the like, RAM that is used as a work memory, and the like.

A keys/indicators section 37 is configured of main keys, indicators, and the like which are provided on a casing of the projector 10. Operation signals of the keys/indicators section 37 are sent out directly to the processor 38. Key operation signals from a remote controller are received by an IR reception section 35 and are then demodulated into a code signal in an Ir processing section 36 for output to the processor 38.

The processor 38 is connected with an audio processing section 47 by way of the system bus SB. This audio processing section 47 includes a circuitry for a sound source such as a PCM sound source. With the projector 10 set in a projection mode and the reproducing mode, the audio processing section 47 converts audio data into analog signals and drives a speaker 48 to output loudly sound or voice based on the audio data.

The processor 38 controls a light source control circuit 41. The light source control circuit 41 controls separately the operation of an excitation light shining device of the light source unit 60 in such a manner that lights in predetermined wavelength ranges required in generating an image are emitted from the light source unit 60.

Figure 2:
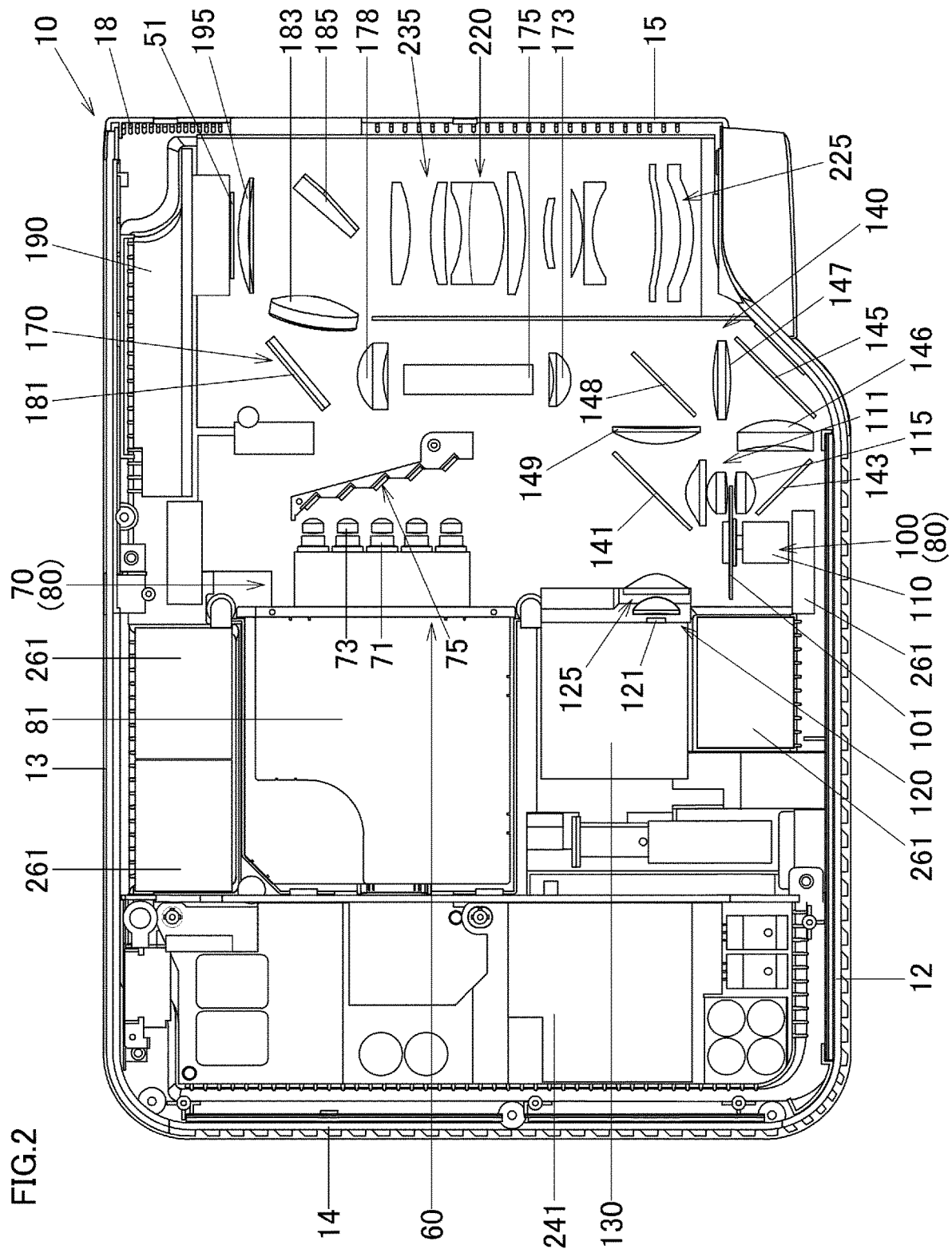
FIG. 2 is a schematic plan view showing an internal structure of the projector according to the embodiment.

FIG. 2 is a schematic plan view showing an internal structure of the projector 10. The projector 10 includes the light source unit 60, a light source-side optical system 170, the projection optical system 220, and the like. Additionally, the projector 10 drives a drive section (which includes an excitation light shining device 70, a red light source device 120, a luminescent wheel device 100, the display device 51, and the like) inside the light source unit 60, the drive section being connected with a circuit board including internal power circuit blocks, light source control blocks, and the like.

The light source unit 60 includes the excitation light shining device 70, which constitutes not only a light source of light having a wavelength in the blue wavelength range or simply light in the blue wavelength range (light in a first wavelength range) but also a light source of excitation light, a green light source device 80, which constitutes a light source of light having a wavelength in the green wavelength range or simply light in the green wavelength range (light in a second wavelength range), and a red light source device 120, which constitutes a light source of light having a wavelength in the red wavelength range or simply light in the red wavelength range (light in a third wavelength range).

The green light source device 80 is configured of the excitation light shining device 70 and the luminescent wheel device 100.

A light guiding optical system 140, which is configured to guide lights in the blue, green and red wavelength ranges, and the light source-side optical system 170 are disposed in the light source unit 60. The light guiding optical system 140 guides lights emitted from the excitation light shining device 70, the green light source device 80, and the red light source device 120 to the light source-side optical system 170.

The excitation light shining device 70 is disposed on a side of the projector 10 where a back panel 13 is provided. The excitation light shining device 70 includes a group of light sources made up of multiple blue laser diodes 71 (a first light source). The blue laser diodes 71 are semiconductor light emitting elements and are disposed in such a manner that axes of lights emitted therefrom become substantially parallel to an axis of light emitted from a red light emitting diode 121 (a third light source) of the red light source device 120.

The group of light sources described above is made up by disposing the multiple blue laser diodes 71 into a matrix configuration. In the present embodiment, when the group of light sources or multiple blue laser diodes 71 is seen from a side of the projector 10 where a left side panel 15 is provided as shown in FIG. 2, the blue laser diodes 71 are arranged into a matrix configuration of two rows and five columns (refer to FIG. 3). In addition, collimator lenses 73 are disposed individually on respective optical axes of the blue laser diodes 71 to convert lights emitted from the blue laser diodes 71 into parallel lights so as to enhance the directivity thereof. A reflection mirror group 75 is provided in such a manner that reflection mirrors thereof are disposed individually on respective optical axes of the corresponding collimator lenses 73. The reflection mirror group 75 changes axes of lights in the blue wavelength range emitted from the blue laser diodes 71 through 90 degrees in the direction of a front panel 12. A heat sink 81 is disposed between the blue laser diodes 71 and a right side panel 14. In addition, a cooling fan 261 is disposed between the heat sink 81 and the back panel 13. The blue laser diodes 71 are cooled by the cooling fan 261 and the heat sink 81.

The luminescent wheel device 100, which makes up the green light source device 80, is disposed on an optical path of excitation light emitted from the excitation light shining device 70 and in the vicinity of a front panel 12. The luminescent wheel device 100 includes a luminescent wheel 101 (a second light source), a motor 110, a collective lens group 111, and a collective lens 115. The luminescent wheel 101 is disposed in such a manner as to be at right angles to an axis of light emitted from the excitation light shining device 70. The motor 110 drives to rotate the luminescent wheel 101. The collective lens group 111 not only collects a pencil of excitation light emitted from the excitation light shining device 70 but also collects a pencil of light emitted from the luminescent wheel 101 in the direction of the back panel 13. The collective lens 115 collects a pencil of light emitted from the luminescent wheel 101 in the direction of the front panel 12. A cooling fan 261 is disposed between the motor 110 and the front panel 12, and this cooling fan 261 cools the luminescent wheel 101 and the like.

Figure 4:
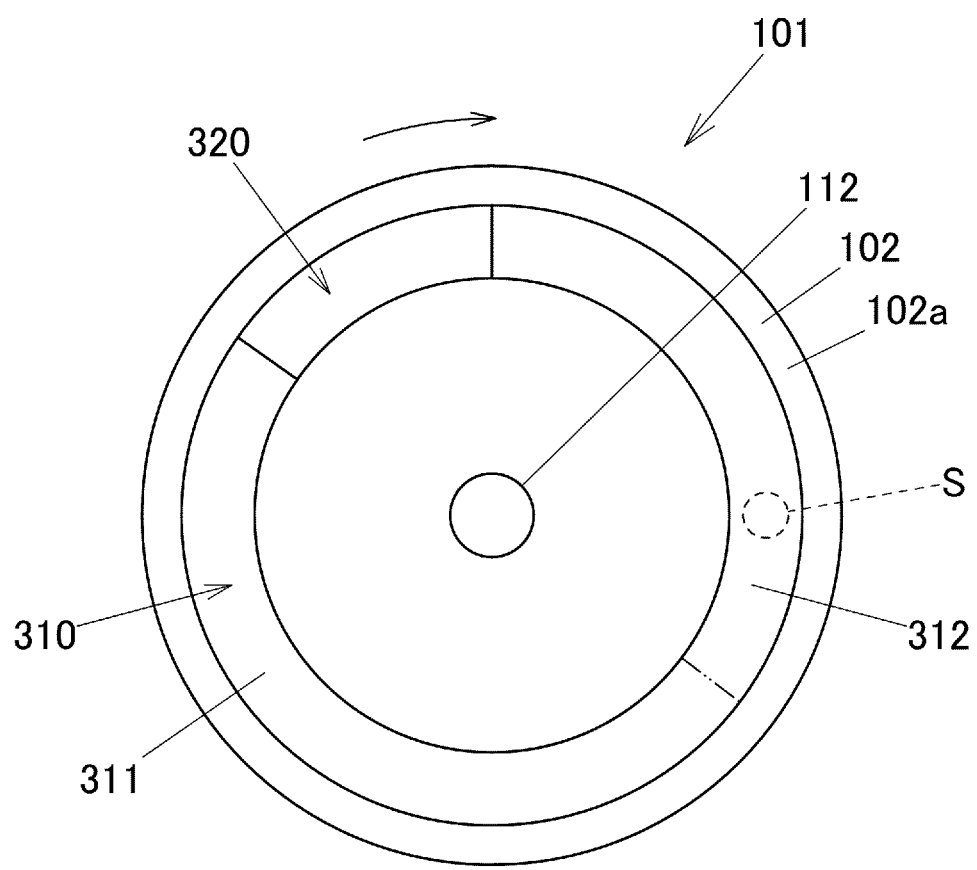
FIG. 4 is a schematic view of a luminescent wheel according to the embodiment, as seen from a front side of the luminescent wheel.

FIG. 4 is a schematic view of the luminescent wheel 101 as seen from a front side thereof. A luminescent light emitting area 310 having a shape of a C ring and a transmitting area 320 having a shape of an arc are provided end to end in a circumferential direction on the luminescent wheel 101. The luminescent light emitting area 310 receives light in the blue wavelength range emitted from the excitation light shining device 70 and collected by the collective lens group 111 as excitation light and emits luminescent light, which is light in the green wavelength range. The transmitting area 320 transmits light in the blue wavelength range emitted from the excitation light shining device 70 or transmits the blue light while diffusing it.

A base 102 of the luminescent wheel 101 is formed of a circular disk of metal such as copper, aluminum, or the like. An annular reflecting portion is formed on a surface 102*a* of a side of the base 102 which faces the excitation light shining device 70. This reflecting portion is mirror finished through silver deposition or the like. A green luminescent material layer is laid on a surface of the mirror-finished reflecting portion to thereby form the luminescent light emitting area 310. A transparent base having transmissivity is fitted in an arc-shaped cutout through hole portion formed in the base 102 to thereby form the transmitting area 320. In the case of the transmitting area 320 being an area where excitation light is transmitted while being diffused, minute irregularities are formed on a surface of the transparent base through sand blasting or the like.

When light in the blue wavelength range emitted from the excitation light shining device 70 is shined onto the luminescent light emitting area 310 (for example, refer to a shining area S in FIG. 4), a green luminescent material in the green luminescent material layer is excited, whereby the luminescent light emitting area 310 emits light in the green wavelength range in every direction as luminescent light. Light in the green wavelength rage is emitted towards the back panel 13 and is incident on the collective lens group 111. On the other hand, light in the blue wavelength range incident on the transmitting area 320 is transmitted through the luminescent wheel 101 or is transmitted through the luminescent wheel 101 while being diffused and is then incident on the collective lens 115, which is disposed on a back surface side (in other words, a side facing the front panel 12) of the luminescent wheel 101.

The collective lens group 111 not only collects a pencil of light in the blue wavelength range emitted from the excitation light shining device 70 to the luminescent wheel 101 but also collects a pencil of light emitted from the luminescent wheel 101. The collective lens 115 collects a pencil of light which is transmitted through and emitted from the luminescent wheel 101.

The red light source device 120 includes a red light emitting diode 121, which is a semiconductor light emitting element disposed in such a manner that an axis of light emitted therefrom becomes parallel to an axis of light emitted from the blue laser diodes 71, and a collective lens group 125 for collecting light in the red wavelength range emitted from the red light emitting diode 121. The red light source device 120 is disposed in such a manner that an axis of light in the red wavelength range emitted from the red light emitting diode 121 intersects an axis of light in the green wavelength range emitted from the luminescent wheel 101 and reflected by a first dichroic mirror 141. The red light source device 120 is cooled by a heat sink 130, which is disposed on a side thereof which faces a right side panel 14, and a cooling fan 261 or the like.

The light guiding optical system 140 includes the first dichroic mirror 141, a second dichroic mirror 148, a first reflecting mirror 143, a second reflecting mirror 145, and multiple collective lenses 146, 147, 149 for collecting pencils of light.

The first dichroic mirror 141 is disposed in a position where light in the blue wavelength range emitted from the excitation light shining device 70 and light in the green wavelength range emitted from the luminescent wheel 101 intersect light in the red wavelength range emitted from the red light source device 120. The first dichroic mirror 141 transmits light in the blue wavelength range and light in the red wavelength range and reflects light in the green wavelength range. An axis of light in the green wavelength range emitted from the luminescent wheel 101 is changed in direction through 90 degrees in the direction of the left side panel 15 by the first dichroic mirror 141.

In addition, the first reflecting mirror 143 is disposed on an axis of light in the blue wavelength range which is transmitted or transmitted while being diffused through the luminescent wheel 101, that is, between the collective lens 115 and the front panel 12. The first reflecting mirror 143 reflects light in the blue wavelength range and changes in direction an axis of the light in the blue wavelength range through 90 degrees in the direction of the left side panel 15. The collective lens 146 is disposed at a side of the first reflecting mirror 143 which faces the left side panel 15. The second reflecting mirror 145 is disposed at a side of the collective lens 146 which faces the left side panel 15. The second reflecting mirror 145 changes in direction an axis of light in the blue wavelength range which is collected by the collective lens 146 through 90 degrees towards the back panel 13. The collective lens 147 is disposed at aside of the second reflecting mirror 145 which faces the back panel 13.

The collective lens 149 is disposed at a side of the first dichroic mirror 141 which faces the left side panel 15. An axis of light in the red wavelength range that passes through the first dichroic mirror 141 is incident on the collective lens 149. An axis of light in the green wavelength range that is reflected by the first dichroic mirror 141 substantially coincides in position with the axis of the light in the red wavelength range that passes through the first dichroic mirror 141 and is then incident on the collective lens 149.

The second dichroic mirror 148 is disposed at a side of the collective lens 149 which faces the left side panel 15 and at a side of the collective lens 147 which faces the back panel 13. The second dichroic mirror 148 reflects light in the red wavelength range and light in the green wavelength range and transmits light in the blue wavelength range. As a result, light in the red wavelength range and light in the green wavelength range which are collected by the collective lens 149 are reflected by the second dichroic mirror 148 and are then incident on a collective lens 173 of the light source-side optical system 170. On the other hand, light in the blue wavelength range which has passed through the collective lens 147 passes through the second dichroic mirror 148 and is then collected to an incident port of a light guiding device 175 such as a glass rod or the like by way of the collective lens 173.

The light source-side optical system 170 includes the collective lens 173, the light guiding device 175, a collective lens 178, a light axis changing mirror 181, a collective lens 183, a shining mirror 185, and a condenser lens 915. The condenser lens 195 emits image light emitted from the display device 51, which is disposed on a side of the condenser lens 195 which faces the back panel 13, towards the projection optical system 220, and therefore, the condenser lens 195 is included in the projection optical system 220 as a part thereof.

The collective lens 173, which is disposed in the vicinity of the light guiding device 175, collects light source light to the incident port of the light guiding device 175. Light in the red wavelength range, light in the green wavelength range, and light in the blue wavelength range are collected by the collective lens 173 to be incident on the light guiding device 175. A pencil of light incident on the light guiding device 175 is transformed into a pencil of light whose intensity is distributed more uniformly by the light guiding device 175.

The collective lens 178 and the light axis changing mirror 181 are disposed on an optical axis of the light guiding device 175 at a side of the light guiding device 175 which faces the back panel 13. An axis of the pencil of light emerging from an emerging port of the light guiding device 175 is collected by the collective lens 178, whereafter the axis of the pencil of light so collected is then changed in direction towards the left side panel 15 by the light axis changing mirror 181.

The pencil of light reflected by the light axis changing mirror 181 is shined onto the display device 51 at a predetermined angle by way of the condenser lens 195. In the present embodiment, the display device 51 is the digital micromirror device or DMD including a number of microscopic mirrors. A heat sink 190 is provided at a side of the display device 51 which faces the back panel 13, and the display device 51 is cooled by this heat sink 190.

Combined light source light, that is, component lights 90 shined onto an image forming plane of the display device 51 by the light source-side optical system 170 are reflected by the image forming plane of the display device 51 and are then projected onto a screen by way of the projection optical system 220 as image light. Here, the projection optical system 220 includes the condenser lens 195, and the movable lens group 235 and a fixed lens group 225, which are provided in a lens barrel. The lens barrel is made into a variable-focus lens and is configured so as to enable zooming and focusing. The movable lens group 235 can be adjusted manually or automatically using a lens motor 45.

With the projector 10 configured as described heretofore, when the luminescent wheel 101 is rotated synchronously, and light is emitted from the excitation light shining device 70 and the red light source device 120 at appropriate timings, light in the green wavelength range, light in the blue wavelength range, and light in the red wavelength range are incident on the collective lens 173 by way of the light guiding optical system 140 and is then incident on the display device 51 by way of the light source-side optical system 170. As a result, a color image can be projected onto the screen as a result of the display device 51 displaying the lights in the blue, green, and red wavelength ranges in a time-dividing fashion according to data.

Figure 5A:
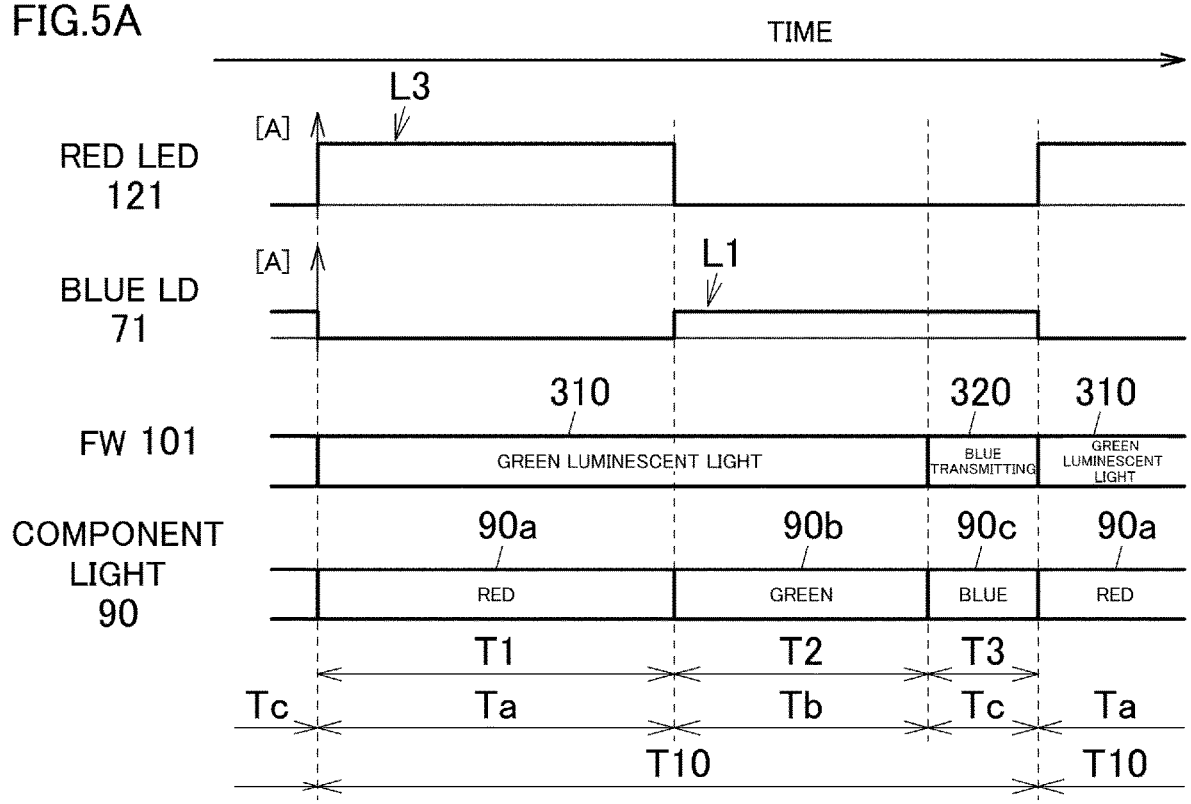
FIG. 5A is a timing chart of a projector according to the embodiment showing a case in which the projector is driven by 100% of a power consumption of the projector.
Figure 5B:
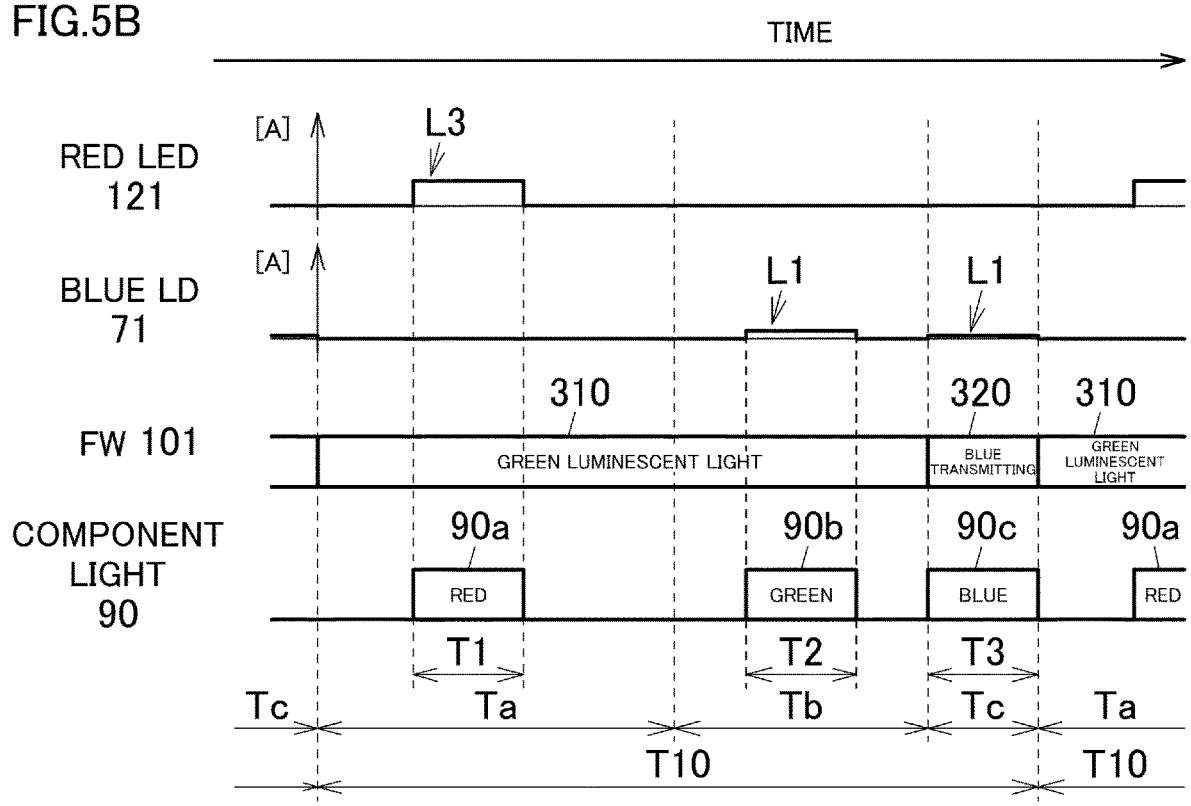
FIG. 5B is a timing chart of the projector according to the embodiment showing an operation of the projector with its power consumption suppressed.

FIGS. 5A and 5B are timing charts of the light source unit 60. In addition, FIG. 6 is a chart showing examples of set values for the light source unit 60 when the light source unit 60 emits individual component lights 90 of light in the red wavelength range, light in the green wavelength range, and light in the blue wavelength range. In FIG. 6, a setting example 91 (corresponding to a timing chart in FIG. 5A) shows set values for "Duty" and "Input Current" in a case in which the light source unit 60 is driven to 100% of its power consumption. A setting example 92, a setting example 93 (corresponding to a timing chart in FIG. 5B), and a setting example 94 show set values for "Duty" and "Input Current" in a case in which the power consumption is suppressed to be lower than the power consumption employed in the setting example 91. The setting examples 91 to 93 are set by a first dimming mode in which a quantity of light is adjusted in gradation control periods during which lights are emitted from the excitation light shining device 70, the green light source device 80, and the red light source device 120. On the other hand, the setting example 94 is set by a second dimming mode in which a quantity of light in the blue wavelength range is adjusted by causing the first light source to be turned off in a gradation control period T3 during which light in the first wavelength range is emitted by the blue laser diodes 71 of the excitation light shining device 70 and a quantity of light of the first light source is adjusted in a gradation control period T2 during which light in the second wavelength range is emitted by the blue laser diodes 71 of the excitation light shining device 70.

The timing chart in FIG. 5A will be described. The projector 10 can project a still image or a dynamic image by forming one image frame for every two unit periods T10 and projecting continuously multiple image frames. The light source unit 60 divides a unit period T10 into time periods arranged in the order of an output period Ta, an output period Tb, and an output period Tc, emits light in the red wavelength range 90a, light in the green wavelength range 90b, and light in the blue wavelength range 90c, which are component lights 90 allocated in advance individually to the output periods Ta to Tc, and guides the lights so emitted to the display device 51. The unit period T10 corresponds to a time required for the luminescent wheel 101 to rotate 360° (one full rotation).

The red light emitting diode 121 is supplied with electric current in the output period Ta and emits light in the red wavelength range L3, whereas the red light emitting diode 121 is turned off in the output period Tb and the output period Tc and does not emit light in the red wavelength range L3. The blue laser diodes 71 are turned off in the output period Ta and do not emit light in the blue wavelength range L1, whereas the blue laser diodes 71 are supplied with electric current in the output period Tb and the output period Tc and emit light in the blue wavelength range L1. In addition, the shining area S shown in FIG. 4 is positioned on one area 311 of the luminescent light emitting area 310 in the output period Ta. When the shining area S is positioned on the area 311, light in the blue wavelength range L1 is not emitted. The shining area S is positioned on the other area 312 of the luminescent light emitting area 310 in the output period Tb. The shining area S is positioned on the transmitting area 320 in the output period Tc.

In the output period Ta, light in the red wavelength range L3 emitted from the red light emitting diode 121 is guided by the light guiding optical system 140 (refer to FIG. 2), whereby the light source unit 60 guides light in the red wavelength range 90a to the light source-side optical system 170 as component light 90 in the output period Ta. The display device 51 shown in FIG. 2 uses a whole period during which the light in the red wavelength range 90a is emitted as the gradation control period T1 and can execute a gradation control over this gradation control period T1.

In the output period Tb, since light in the blue wavelength range L1 output from the blue laser diodes 71 is shined onto the luminescent light emitting area 310 of the luminescent wheel 101, light in the green wavelength range is emitted from the luminescent light emitting area 310. Since the light in the green wavelength range emitted from the luminescent light emitting area 310 is guided by the light guiding optical system 140, the light source unit 60 guides light in the green wavelength range 90b to the light source-side optical system 170 as component light 90 in the output period Tb. The display device 51 uses a whole period during which the light in the green wavelength range 90b is emitted as the gradation control period T2 and can execute a gradation control over this gradation control period T2.

In the output period Tc, since the light in the blue wavelength range L1 emitted from the blue laser diodes 71 is shined onto the transmitting area 320 of the luminescent wheel 101, the transmitting area 320 transmits the light in the blue wavelength range L1 shined thereon. Then, since the light in the blue wavelength range L1 emitted from the transmitting area 320 is guided by the light guiding optical system 140, the light source unit 60 guides light in the blue wavelength range 90c to the light source-side optical system 170 as component light 90 in the output period Tc. The display device 51 uses a whole period during which the light in the blue wavelength range 90c is emitted as the gradation control period T3 and can execute a gradation control over this gradation control period T3. The gradation control periods T1, T2, T3 substantially correspond to the output periods Ta, Tb, Tc, respectively, in relation to a period length. In the present embodiment, the display device 51 can execute the gradation controls in 256 gradations in the gradation control periods T1, T2, T3.

The setting example 91 in FIG. 6 shows set values for the timing chart shown in FIG. 5A. "Duty" denotes a range of rotation angles [°] of the luminescent wheel 101. In the setting example 91, a rotation angle at which the red light emitting diode 121 emits light in the red wavelength range in the output period Ta is "178°", a rotation angle at which the blue laser diodes 71 emit light in the blue wavelength range in the output period Tb is "127°", and a rotation angle at which the blue laser diodes 71 emit light in the blue wavelength range in the output period Tc is "55°".

In addition, "Input Current" denotes a drive current for the red light emitting diode 121 and the blue laser diodes 71. In the setting example 91, an input current for the red light emitting diode 121 in the output period Ta is "9.20A", an input current for the blue laser diodes 71 in the output period Tb is "4.00A", and an input current for the blue laser diodes 71 in the output period Tc is "4.00A".

In the present embodiment, as shown in FIG. 6, not only can the quantity of image light which is emitted from the display device 51 be adjusted but also the power consumption can be varied by setting times (Duties) for emitting light in the red wavelength range, light in the green wavelength range, and light in the blue wavelength range, as well as input currents for the red light emitting diode 121 and the blue laser diodes 71. The processor 38 is controlled so that a ratio becomes substantially constant of a light quantity set value (a third light quantity set value) obtained by multiplying the input current for the red light emitting diode 121 by a current input time in the output period Ta, a light quantity set value (a second light quantity set value) obtained by multiplying the input current for the blue laser diodes 71 by a current input time in the output period Tb, and a light quantity set value (a first light quantity set value) obtained by multiplying the input current for the blue light emitting diodes 71 by a current input time in the output period Tc. A ratio of the current input times and a ratio of the Duties in the output period Ta, the output period Tb, and the output period Tc are the same, provided that the rotation speed of the luminescent wheel 101 is constant. In the present embodiment, assuming that the light quantity set value in the output period Tc is "1", the light quantity set value in the output period Tb is about "2.3", and the light quantity set value in the output period Ta is about "7.44".

In FIG. 5A, when the output period Tc elapses, an operation in an output period Ta of a subsequent unit period T10 is performed. In the output period Ta, as in the case with the previous output period Ta, the light source unit 60 emits light in the red wavelength range 90a as component light 90 by controlling the red light emitting diode 121, the blue laser diodes 71, the luminescent wheel 101, and the like. Subsequent operations will be repeated similarly as done in the previous unit period T10.

In the setting example 92, a power consumption is set to be 50% of the power consumption in the setting example 91. Input currents for the red light emitting diode 121 and the blue laser diodes 71 in individual output periods Ta, Tb, Tc are "4.60A", "2.00A", and "2.00A", respectively, and they are a half the values in the setting example 91. Duties (current input times) in the output periods Ta, Tb, Tc are the same as those in the setting example 91. As a result, the power consumption can be set at 50% of the power consumption in the setting example 91, and an overall light quantity can also be set substantially at 50% of the overall light quantity in the setting example 91 while a ratio among light quantity set values in the output periods Ta, Tb, Tc is made to remain constant.

In the setting example 93, a power consumption is set to be 12.5% of the power consumption in the setting example 91. Duties of the red light emitting diode 121 and the blue laser diodes 71 in the output periods Ta, Tb, Tc are all set at "55°". In addition, input currents in the output periods Ta, Tb, Tc are "3.72A", "1.15A", and "0.50A", respectively. As a result, an overall light quantity and the power consumption can be set at 25% of those in the setting example 92 (at 12.5% of those in the setting example 91).

In the present invention, it takes a certain length of time or longer (a minimum value of a gradation control period) for the display device 51 to perform a gradation control. For example, assuming that the time required for the display device 51 to perform a gradation control is 1.2 [msec] or longer and that the rotation speed of the luminescent wheel 101 is 120 [rps], a Duty (a rotational angle) required for the luminescent wheel 101 to perform a gradation control is 54° or greater from 1.2 [msec]×120[rps]×360[°]=54[°]. Consequently, in the conditions described above, Duty=54° constitutes a light reduction setting limit, and hence, it is preferable to set the Duty at 55° or greater in order to drive the light source unit 60 stably.

An electric current equal to or greater than a predetermined light emitting threshold current needs to be input into the blue laser diodes 71 in order to cause light to be emitted from the blue laser diodes 71. For example, assuming that a light emitting threshold current for the blue laser diodes 71 used in the present embodiment is 450 [mA], input current=450 mA constitutes a light reduction setting limit. Consequently, it is preferable to set the "input current" for the blue laser diodes 71 at, for example, "0.5A" or greater in order to drive the light source unit 60 stably. A maximum rated current is set for the red light emitting diode 121 and the blue laser diodes 71. For example, in the case that a maximum rated current for the red light emitting diode 121 is of the order of 10A, as shown in the setting example 91, the "input current" for the red light emitting diode 121 is set at "9.20A" which is slightly lower than 10A, while the other set values are determined accordingly in consideration of white balance or the like. As a result, the luminance of a projected image when the power consumption is 100% can be increased to a maximum extent within the rated current, whereby the dimming range can be expanded.

FIG. 5B is a timing chart of the projector 10 when it operates based on settings in the setting example 93. In the setting example 93, a gradation control period T1 is shorter than an output period Ta, and a gradation control period T2 is shorter than an output period Tb. The display device 51 performs a gradation control on light in the red wavelength range 90a and light in the green wavelength range 90b in the gradation control periods T1, T2, respectively. Timings at which an input current is input into the red light emitting diode 121 and the blue laser diodes 71 in the output periods Ta, Tb can be set arbitrarily, whereby the display device 51 can set the gradation control periods T1, T2 in synchronism with periods during which the red light emitting diode 121 and the blue laser diodes 71 emit light in the red wavelength range 90a and light in the green wavelength range 90b, respectively. In addition, the lengths and positions of an output period Tc and a gradation control period T3 are substantially the same, and the display device 51 performs a gradation control over the gradation control period T3.

Next, the setting example 94 will be described. In the setting example 94 shown in FIG. 6, the second dimming mode is used to dim light, and a power consumption is set to be 6.25% of the power consumption in the setting example 91 (that is, 50% of the power consumption in the setting example 93). "Duties" for the red light emitting diode 121 and the blue laser diodes 71 in output periods Ta, Tb, Tc are "55°" as in the case with the setting example 93. "Input Currents" in the output period Ta and the output period Tb are "1.86A" and "0.58A", respectively, which correspond to 50% of the input currents in the setting example 93. In addition, "Duty" and "Input current" for the blue laser diodes 71 in the output period Tc are "55°" and "0.5A", respectively, which are similar to those in the setting example 93. However, as will be described below, the light source unit 60 operates so that a total power consumption and a total quantity of light become 50% of those in the setting example 93.

Figure 7:
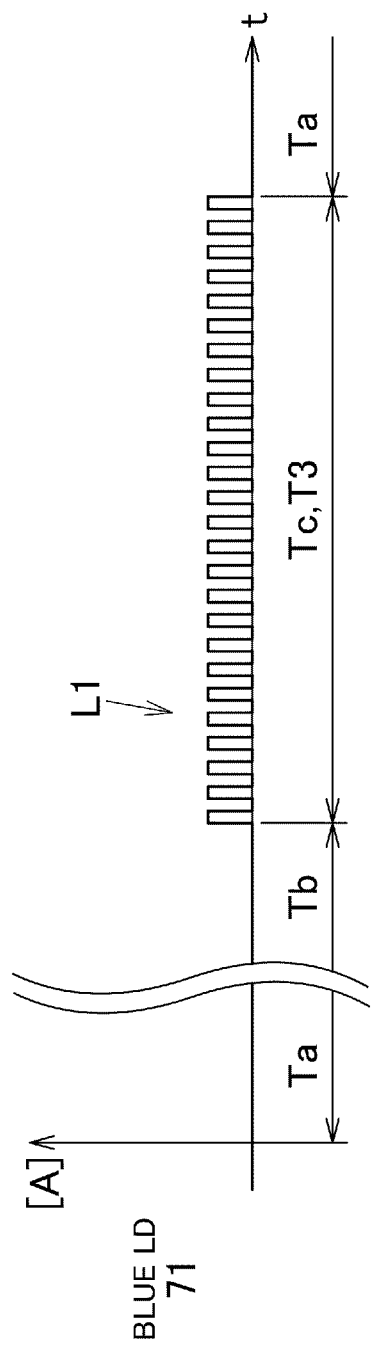
FIG. 7 is a diagram showing a pulse-like input current which is input into the blue laser diode in a second dimming mode according to the embodiment.

FIG. 7 shows a waveform of an input current input into the blue laser diodes 71 during the output period Tc in the setting example 94 (the second dimming mode). The processor 38 can cause light in the blue wavelength range L1 to be emitted in a pulsating fashion by inputting an intermittent pulsating current to the whole of the multiple blue laser diodes 71 of the excitation light shining device 70 to drive them at a low actual value in the second dimming mode of the setting example 94. An ON time and an OFF time of the pulse waveform can be determined in accordance with light quantity set values for the red light emitting diode 121 in the output period Ta and for the blue laser diodes 71 in the output period Tb. In the case that the power consumption is 50% of the power consumption in the setting example 93, the ON time and the OFF time of the pulse waveform can be set substantially at equal intervals. Consequently, a total amount of input current input into the blue laser diodes 71 becomes 50% of that in the setting example 93 (refer to FIG. 6). In this way, the power consumption for emitting light in the blue wavelength range 90c and the quantity of light in the blue wavelength range 90c can be halved.

The frequency of the pulse wave can be set, for example, at several HMz. Additionally, this frequency can be set at a high frequency (for example, two times or greater) which is higher than a switching frequency of the micromirror lenses of the display device 51.

In the second dimming mode of the setting example 94, the processor 38 may turn off a part of the multiple blue laser diodes 71 of the excitation light shining device 70 at all times, allowing the remaining part of the multiple blue laser diodes 71 to emit light in the blue wavelength range L1 at all times. In the multiple blue laser diodes 71 arranged into the matrix configuration shown in FIG. 3, blue laser diodes 71a, 71g, 71c, 71i, and 71e, which are arranged up and down alternately along a horizontal direction, can be turned off at all times as the blue laser diodes 71 that are tuned off at all times. In this way, an irregularity in luminance in light in the blue wavelength range that is shined onto the display device 51 can be reduced by selecting the blue laser diodes 71 that are turned off at all times in a dispersive fashion.

Figure 3:
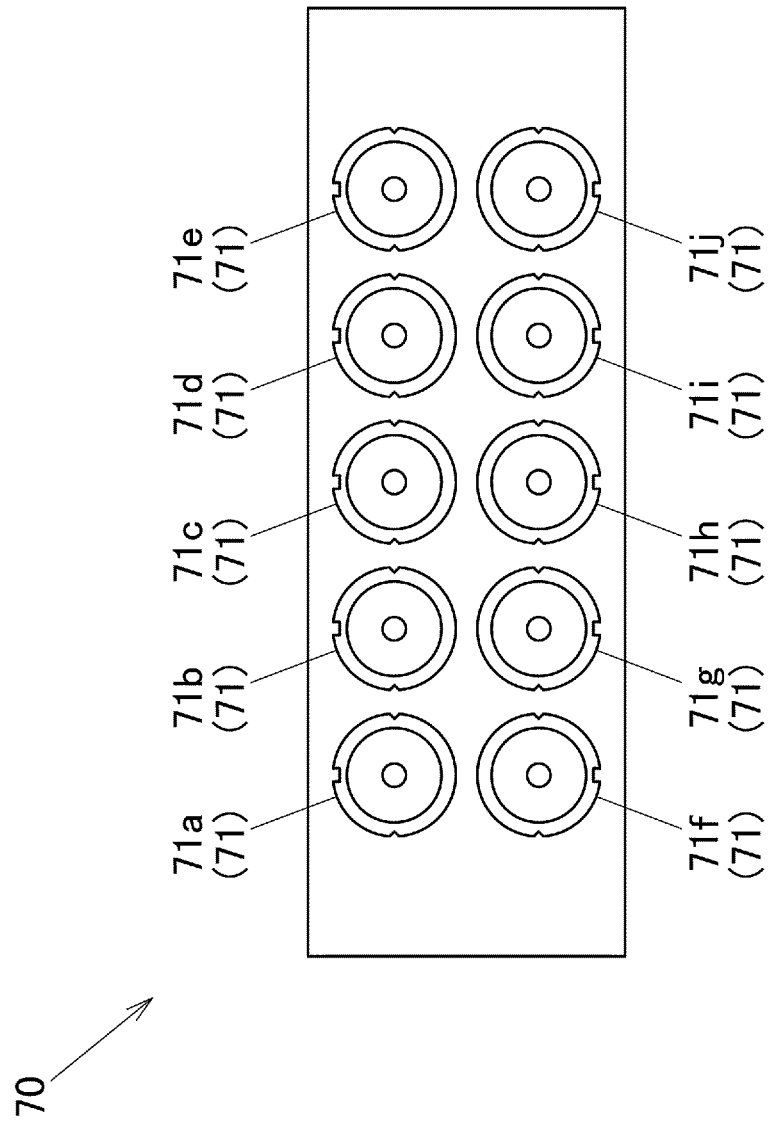
FIG. 3 is a schematic view of a light source group formed of blue laser diodes according to the embodiment, as seen from a side of the projector where a left side panel is provided as shown in FIG. 2.

The blue laser diodes 71 that are turned off at all times may be the blue laser diodes 71a to 71e that are arranged in an upper row, the blue laser diodes 71f to 71j that are arranged in a lower row, the blue laser diodes 71a, 71b, and 71f to 71h that are arranged in a left half portion, or the blue laser diodes 71c to 71e, 71i, and 71j that are arranged in a right half portion of the matrix configuration shown in FIG. 3.

In the second dimming mode described above, for example, in the case that either or both of the blue laser diodes 71 and the display device 51 come to their light reduction setting limits when the brightness of the projector 10 is reduced manually or automatically, the processor 38 may be configured so as to cause the blue laser diodes 71 and the display device 51 to be controlled in the second dimming mode by switching the dimming mode. That is, by its nature, the projector 10 needs to be driven by reducing the current value of the light source; however, being different from the red light emitting diode 121, a lower limit value is determined for an electric current supplied to the blue laser diodes 71, as a result of which the current value cannot be reduced too low to exceed a certain level. Due to this, when light in the blue wavelength range is emitted by the blue laser diodes 71, the illumination of the blue laser diodes 71 is controlled only at the timing at which blue light is emitted, whereas the illumination of the blue laser diodes 71 is not controlled at the timing at which green light is emitted.

With the projector 10 configured so as to be connected with not only a commercial power supply as an AC power supply but also with a battery power supply as a DC power supply as an original power supply, in the case that the projector 10 is caused to exhibit the same brightness as that exhibited by the projector 10 which is driven using the commercial power supply when the projector 10 is driven by being connected with the battery power supply as the original power supply, the driving time of the projector 10 is reduced. Thus, since the power consumption in the second dimming mode is low, when the projector 10 is connected with the battery power supply as the original power supply, the illumination of the blue laser diodes 71 can be controlled using the second dimming mode.

Alternatively, the dimming mode can be switched to the second dimming mode when the residual capacity of the battery is reduced down to a threshold value or lower. Specifically speaking, in the case that the projector 10 is activated to operate by being driven by the battery, the processor 38 can cause the projector 10 to be driven so as to suppress the power consumption to a lower level when the residual capacity of the battery is reduced down to a predetermined threshold value or lower (for example, the setting examples 92 to 94 in FIG. 6).

Alternatively, in the case that a distance to the projection target is a predetermined threshold value or smaller even when the residual capacity of the battery is greater than the predetermined threshold value, determining that the visibility is affected little even with a dark projected image, the processor 38 may drive the projector 10 in such a manner as to suppress the power consumption to a lower level by reducing the brightness of the projector 10. Then, with the projector 10 driven in such a manner as to suppress the power consumption, the light source unit 60 can be driven in the second dimming mode at an arbitrary timing.

Specifically speaking, a proximity mode (the second dimming mode) is provided as a projection mode of the projector 10. In general, the projector 10 incorporates an autofocus function (using an active method) for detecting a distance to a projection surface based on a time taken by an infrared ray or an ultrasonic wave from its irradiation onto and return from the projection surface or an irradiation angle thereof to the projection surface, whereby the distance to the projection surface can be measured. As a result, in the case that the distance from the projector 10 to the projection surface is smaller than a threshold value, determining that the projector 10 is being a projector 10 of a mobile or portable type which is connected to a battery power supply as an original power supply, the proximity mode is automatically set in the projector 10 in which the power consumption is suppressed to a lower level than in the first dimming mode.

By adopting the configuration described above, even when the residual capacity of the battery is equal to or greater than the predetermined threshold value, the illumination of the light source is controlled based on the determination that the user has no problem with the visibility of an image in the case that the distance to the projection surface is equal to or smaller than the predetermined threshold value, whereby the life of the battery can be extended.

Thus, as has been described heretofore, the light source unit 60 and the projector 10 of the present embodiment include the first light source, which is configured of the multiple semiconductor light emitting elements for emitting light in the first wavelength range, the second light source for emitting light in the second wavelength range, the third light source for emitting light in the third wavelength range, the display device 51 for performing the gradation control on lights in the first to third wavelength ranges that are emitted from the corresponding light sources in the time dividing fashion in the gradation control periods T1 to T3 to thereby form image light, and the processor 38. In addition, the processor 38 controls the first dimming mode in which the quantity of light of the first light source is adjusted in the gradation control periods during which light in the first wavelength range, light in the second wavelength range, and light in the third wavelength range are emitted from the semiconductor light emitting elements (the first light source), the second light source, and the third light source, respectively, and the second dimming mode in which the quantity of light of the first light source is adjusted by causing some of the semiconductor light emitting elements (the first light source) to be turned off in the gradation control period during which light in the first wavelength range is emitted, and the quantity of light of the first light source is adjusted in the gradation control period during which light in the second wavelength range is emitted.

The low power consumption mode can be realized by the configurations of the light source unit 60 and the projector 10 that are described above and the light source control method, and even when the light source unit 60 and the projector 10 are driven by the battery, for example, the life of the battery can be extended.

With the light source unit 60 in which the processor 38 drives intermittently the whole of the multiple semiconductor light emitting elements in the second dimming mode to thereby cause light in the first wavelength range to be emitted in the pulsating fashion, the power consumption and the quantity of light can be reduced without reducing the gradation control period T3. When the semiconductor light emitting elements are driven in the pulsating fashion, an increase in temperature of the semiconductor light emitting elements can be suppressed, whereby a risk of the light emitting efficiency of the semiconductor light emitting elements being reduced in association with such an increase in temperature can be reduced. As a result, the semiconductor light emitting elements can be driven more efficiently than when the part of the semiconductor light emitting elements are turned off at all times, while light in the first wavelength range is caused to be emitted from the remaining part of the semiconductor light emitting elements at all times.

With the light source unit 60 in which in the second dimming mode, the processor 38 causes the part of the multiple semiconductor light emitting elements to be turned off at all times, while light in the first wavelength range is caused to be emitted from the remaining part of the semiconductor light emitting elements at all times over the gradation control periods T1 to T3, light in the first wavelength range can be emitted while suppressing the power consumption using the simple control.

With the light source unit 60 in which in the case that either or both of the semiconductor light emitting elements and the display device 51 come to their light reduction setting limits, the processor 38 causes the semiconductor light emitting elements and the display device 51 to be controlled in the second dimming mode, the power consumption and the quantity of light can be suppressed further, whereby the light source unit 60 can be driven in the wider light dimming range.

With the light source unit 60 in which the light reduction setting limit of the semiconductor light emitting elements is the light emitting threshold value of the input current and the light reduction setting limit of the display device 51 is the maximum value at which the gradation control period can be set, the power consumption and the quantity of light can be reduced irrespective of the limitations on the operations of the semiconductor light emitting elements and the display device 51.

The dimming operations in the first dimming mode and the second dimming mode are described as being controlled so that the ratio becomes constant of the first light quantity set value obtained by multiplying the input current for the semiconductor light emitting elements by the current input time in the output period Tc during which light in the first wavelength range is emitted, the second light quantity set value obtained by multiplying the input current for the semiconductor light emitting elements by the current input time in the output period Tb during which light in the second wavelength range is emitted, and the third light quantity set value obtained by multiplying the input current for the third light source by the current input time in the output period Ta during which light in the third wavelength range is emitted. As a result, the power consumption can be reduced while maintaining the color tone such as white balance or the like substantially constant.

With the light source unit 60 in which the light in the first wavelength range, light in the second wavelength range, and light in the third wavelength range are light in the blue wavelength range, light in the green wavelength range, and light in the red wavelength range, respectively, and the first light source, the second light source, and the third light source are the blue laser diodes 71, the luminescent wheel 101, and the red light emitting diode 121, respectively, the display device 51 can form a color image with the configuration of the limited number of light emitting elements.

In the present embodiment that has been described heretofore, the processor 38 is described as causing the semiconductor light emitting elements (71) to emit light in the first wavelength range (blue light) in the pulsating fashion by driving intermittently the whole of the semiconductor light emitting elements (71) or causing the remaining part of the semiconductor light emitting elements (71) to emit light in the first wavelength range (blue light) at all times over the gradation control periods by turning off the part of the multiple semiconductor light emitting elements (71) at all times; however, the present invention is not limited to this configuration.

For example, in the case that a duty ratio resulting from dividing the pulse width by the pulse period (period) is 0.25 (25%), or in the case of a configuration in which three fourth of the multiple semiconductor light emitting elements (71) are turned off at all times, while the remaining portion or one fourth of the semiconductor light emitting elements (71) are caused to emit light in the first wavelength range (blue light) at all times over the gradation control periods, the following control can also be performed. The duty ratio is made to be 0.5 (50%), and one half of the multiple semiconductor light emitting elements (71) are turned off at all times, while the remaining portion or the other half of the semiconductor light emitting elements (71) are caused to emit light in the first wavelength range (blue light) at all times over the gradation control periods, whereby the same brightness control can be performed. Consequently, a configuration may be adopted in which in the second dimming mode, the processor 38 causes apart of the multiple semiconductor light emitting elements (71) to be turned off at all times, while the processor 38 causes light in the first wavelength range (blue light) to be driven intermittently so that light in the first wavelength range (blue light) can be emitted in the pulsating fashion from the remaining portion or the other half of the semiconductor light emitting elements (71). By adopting this configuration, in the case that the residual capacity of the battery is extremely low, that is, even with a power consumption which is smaller than 6.25%, the light source can be kept illuminated to continue the projection without being stopped.

In addition, the first light source is described as being configured of the multiple semiconductor light emitting elements (71); however, the present invention is not limited to this configuration. In the case that the number of semiconductor light emitting elements (71) to be turned on or illuminated is controlled when the processor 38 causes one or some semiconductor light emitting elements (71) to be turned off, multiple semiconductor light emitting elements are necessary. However, there may be provided one semiconductor light emitting element when one semiconductor light emitting element is driven intermittently to emit light in the first wavelength range in a pulsating fashion.

In the embodiment of the present invention, the luminescent light emitting area 310, which has the C ring-like shape, and the transmitting area 320, which has the circular arc-like shape, are described as being provided end to end in the circumferential direction on the luminescent wheel 101. However, the present invention is not limited to this configuration. In place of the transmitting area 320 configured to transmit excitation light, a reflecting area configured to reflect excitation light may be used as the excitation light shining area by changing the configuration of the optical element. In addition, the transmitting area 320 or the reflecting area and the luminescent light emitting area 310 may be disposed fixedly together or in such a manner as to vibrate without using the rotating luminescent wheel 101. In this case, the position where the excitation light source for shining excitation light onto the excitation light shining area is disposed and the position where the excitation light source for shining excitation light onto the luminescent light emitting area is disposed may be changed. Alternatively, excitation light may be reflected using a movable mirror so that excitation light is shined onto the transmitting area 320 or the reflecting area and the luminescent light emitting area 310 in a time dividing fashion.

While the embodiment of the present invention has been described heretofore, the embodiment is presented as an example, and therefore, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A light source unit comprising:
   a first light source for emitting light in a first wavelength range;
   a second light source for emitting light in a second wavelength range which differs in wavelength range from the first wavelength range;
   a display device configured to perform a gradation control on the light in the first wavelength range and the light in the second wavelength range which are emitted in a time dividing fashion in corresponding gradation control periods to thereby form image light; and
   a processor configured to control a first dimming mode for adjusting a quantity of light of the first light source in the gradation control periods during which the light in the first wavelength range and the light in the second wavelength range are emitted, respectively, and a second dimming mode for adjusting the quantity of light of the first light source by performing a turn-off control in which at least one of turning on and turning off the first light source is controlled in at least a partial period of the gradation control period during which the light in the first wavelength range is emitted and adjusting the quantity of light of the first light source in the gradation control period during which the light in the second wavelength range is emitted,
   wherein the first light source is a semiconductor light emitting element, and
   wherein when one or both of the semiconductor light emitting element and the display device come to their light reduction setting limits, the processor controls the semiconductor light emitting element and the display device using the second dimming mode.

2. A light source unit comprising:
   an excitation light source for emitting excitation light;
   an excitation light shining area for transmitting or reflecting the excitation light;
   a luminescent light emitting area having formed thereon a luminescent material layer configured to be excited by the excitation light to emit luminescent light; and
   a processor having a dimming mode for adjusting a quantity of light of the excitation light source by performing a turn-off control in which at least one of turning on and turning off the excitation light source is controlled in at least a partial period of a period during which the excitation light is transmitted through or is reflected by the excitation light shining area and adjusting the quantity of light of the excitation light source in a period during which the excitation light is shined onto the luminescent light emitting area wherein the dimming mode is a second dimming mode,
wherein the processor has a first dimming mode for adjusting a quantity of the excitation light in a period during which the excitation light is transmitted through or is reflected by the excitation light shining area and a period during which the excitation light is shined onto the luminescent light emitting area,
wherein the excitation light source is a semiconductor light emitting element for emitting light in a first wavelength range which is the excitation light,
wherein the light source unit comprises further a display device configured to perform a gradation control on the light in the first wavelength range and light in a second wavelength range which is the luminescent light, the light in the first wavelength range and the light in the second wavelength range being emitted in a time dividing fashion, in corresponding gradation control periods to thereby form image light, and
wherein when one or both of the semiconductor light emitting element and the display device come to their light reduction setting limits, the processor controls the semiconductor light emitting element and the display device using the second dimming mode.

3. The light source unit according to claim 2,
wherein in the turn-off control performed by the processor, the semiconductor light emitting element is driven intermittently to emit the light in the first wavelength range in a pulsating fashion.

4. The light source unit according to claim 2,
wherein the excitation light source is multiple semiconductor light emitting elements for emitting light in a first wavelength range which is the excitation light, and
wherein in the turn-off control performed by the processor, a part of the multiple semiconductor light emitting elements is turned off at all times, while a remaining part of the multiple semiconductor light emitting elements is caused to emit the light in the first wavelength range at all times.

5. The light source unit according to claim 2,
wherein the excitation light source is multiple semiconductor light emitting elements for emitting light in a first wavelength range which is the excitation light, and
wherein in the turn-off control performed by the processor, a part of the multiple semiconductor light emitting elements is turned off at all times, while the light in the first wavelength range is driven intermittently so that the light in the first wavelength range is emitted in a pulsating fashion from a remaining part of the multiple semiconductor light emitting elements.

6. The light source unit according to claim 1,
wherein in the turn-off control performed by the processor, the semiconductor light emitting element is driven intermittently to emit the light in the first wavelength range in a pulsating fashion.

7. The light source unit according to claim 1
wherein the first light source is multiple semiconductor light emitting elements, and
wherein in the turn-off control performed by the processor, a part of the multiple semiconductor light emitting elements is turned off at all times, while a remaining part of the multiple semiconductor light emitting elements is caused to emit the light in the first wavelength range at all times.

8. The light source unit according to claim 1,
wherein the first light source is multiple semiconductor light emitting elements, and
wherein in the turn-off control performed by the processor, a part of the multiple semiconductor light emitting elements is turned off at all times, while the light in the first wavelength range is driven intermittently so that the light in the first wavelength range is emitted in a pulsating fashion from a remaining part of the multiple semiconductor light emitting elements.

9. The light source unit according to claim 2,
wherein the light reduction setting limit of the semiconductor light emitting element is a light emitting threshold value for an input current, and
wherein the light reduction setting limit of the display device is a minimum value at which the gradation period can be set.

10. The light source unit according to claim 3, comprising further:
a third light source for emitting light in a third wavelength range which differs in wavelength range from the light in the first wavelength range and the light in the second wavelength range,
wherein the display device performs a gradation control on the light in the third wavelength range that is shined in a time dividing fashion in a corresponding gradation control period to thereby emit image light, and
wherein the processor causes a quantity of light of the third light source to be adjusted using the first dimming mode and the second dimming mode in the gradation control period during which the light in the third wavelength range is emitted.

11. The light source unit according to claim 6,
wherein the second light source comprises a luminescent light emitting area having formed thereon a luminescent material layer configured to be excited by the light in the first wavelength range to thereby emit the light in the second wavelength range as luminescent light,
wherein the light source unit comprises further a third light source for emitting light in a third wavelength range which differs in wavelength range from the light in the first wavelength range and the light in the second wavelength range,
wherein the display device performs a gradation control on the light in the third wavelength range that is shined in a time dividing fashion in a corresponding gradation control period to thereby emit image light, and
wherein the processor causes a quantity of light of the third light source to be adjusted using the first dimming mode and the second dimming mode in the gradation control period during which the light in the third wavelength range is emitted.

12. The light source unit according to claim 10,
wherein the adjustment of quantity of light in the first dimming mode and the second dimming mode is controlled so that a ratio becomes constant of a first light quantity set value obtained by multiplying an input current of the semiconductor light emitting element by a current input time in an output period of the light in the first wavelength range, a second light quantity set value obtained by multiplying an input current of the semiconductor light emitting element by a current input time in an output period of the light in the second wavelength, and a third light quantity set value obtained by multiplying an input current of the third light source by a current input time in an output period of the light in the third wavelength range.

13. The light source unit according to claim 10,
wherein the light in the first wavelength range is light in a blue wavelength range,
wherein the light in the second wavelength range is light in a green wavelength range,
wherein the light in the third wavelength range is light in a red wavelength range,
wherein the semiconductor light emitting element is a blue laser diode,
wherein the luminescent light emitting area comprises a luminescent body configured to emit the light in the green wavelength range as a result of the light in the blue wavelength range being shined thereon, and
wherein the third light source is a red light emitting diode.

14. A projector comprising:
the light source unit according to claim 1;
a projection optical system for projecting the image light emitted from the display device onto a screen; and
a processor for controlling the display device and the light source unit.

15. A light source control method for a light source unit,
wherein the light source unit comprises:
a first light source for emitting light in a first wavelength range;
a second light source for emitting light in a second wavelength range which differs in wavelength range from the first wavelength range;
a display device configured to perform a gradation control on the light in the first wavelength range and the light in the second wavelength range which are emitted in a time dividing fashion in corresponding gradation control periods to thereby form image light; and
a processor, and
wherein the processor controls a first dimming mode for adjusting a quantity of the first light source in the gradation control periods during which the light in the first wavelength range and the light in the second wavelength range are emitted, respectively, and a second dimming mode for adjusting the quantity of light of the first light source by performing a turn-off control in which at least one of turning on and turning off the first light source is controlled in at least a partial period of the gradation control period during which the light in the first wavelength range is emitted and adjusting the quantity of light of the first light source in the gradation control period during which the light in the second wavelength range is emitted,
wherein the first light source is a semiconductor light emitting element, and
wherein when one or both of the semiconductor light emitting element and the display device come to their light reduction setting limits, the processor controls the semiconductor light emitting element and the display device using the second dimming mode.

* * * * *